Patented May 22, 1928.

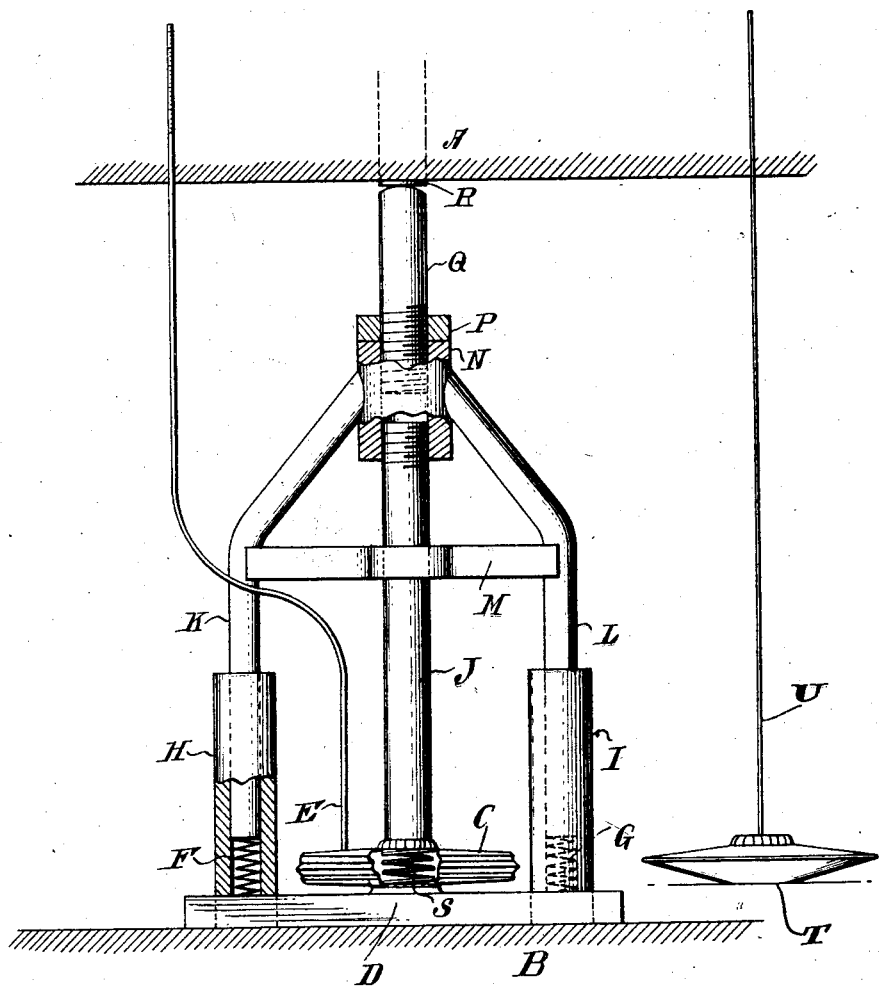

1,670,981

UNITED STATES PATENT OFFICE.

WAYNE A. PERKINS AND WARREN W. GAYMAN, OF SACRAMENTO, CALIFORNIA.

DEVICE FOR STRESS MEASURING OR TESTING.

Application filed December 1, 1925. Serial No. 72,606.

Our invention relates to a stress measuring device operated by use of a liquid, whereby any movement of a structure or member thereof may be observed.

The basic principle employed is in the combination of a small tube with its upper end calibrated and made of glass or other transparent material and its lower end attached to and entering into a large collapsible container holding a liquid, and connecting means with the surfaces desired to test.

One of the principal objects of our invention is to measure any stress within a structure such as a large reinforced concrete dam, by having the device built in an inaccessible chamber within the structure and the graduated end of the small tube led to some convenient point for observation without direct access to the main portion of the device.

Another object of this stress measuring device is to be able to observe any movement of a liquid from or to the large collapsible receptacle into the small graduated tube through the compression or through the expansion of the opposite faces of said receptacle.

These and other objects of our invention will be more fully pointed out hereinafter in the detailed description of the device.

Reference is had to the accompanying drawing illustrating the device and forming a part of this specification.

Figure 1 is a front elevation of the device, with one guide sleeve shown in cross section, placed within a cavity in a structure.

Reference is made to the drawing where it will be noted there is a large, hollow, flexible, liquid-tight container or receptacle C, Fig. 1, which when in operation is filled with any liquid such as water or oil. Attached to said container is a small tube E, the graduated end thereof being made of glass or other appropriate transparent substance through which the liquid also contained therein may be observed when in use.

A and B represent two surfaces or points between which it is desired to measure any movement that may take place. Member R is the end of a column, slightly extending through surface A, and rigidly imbedded therein, against which upper end of rod Q is in direct contact.

A large bar D serves as a base for support of the device and its members that are attached thereto or rest thereon. A threaded rod J is attached at its lower end to container C and passes through yoke M, and it is attached by screw means to connecting nut or block N. An adjusting nut P for calibrating the device abuts against the upper portion of block N and assists in adjusting the device into operating position. A rod Q is in contact at its upper end with member R, and its lower portion is threaded, upon which is operated threaded adjusting nut P to raise or lower rod Q and through which any movement of upper wall A would be communicated, and by the aid of which adjustment is made by adjusting nut P. Rod Q is slidable in block N. The yoke or brace M supports side rods K and L at its respective ends being rigidly attached thereto and serves as a guide and support for rod J, which as before mentioned passed through the center thereof.

Side rods K and L are fitted to slide freely up or down in guide sleeves H and I respectively. Guide sleeves H and I are in turn rigidly fastened to base D.

Coil springs F and G are placed at the bottom of and within guide sleeves H and I and act against side rods K and L respectively. These springs F and G serve to take up all lost motion, carry the weight of the moving parts of the device, but at the same time allow any movement which it is desired to measure to take place.

By making small pipe E sufficiently long, the device may be built into an inaccessible chamber and the graduated end of pipe E can be located at some convenient point for observation and recording of movements without direct access to the man portion of the device.

Allowance for temperature changes may be provided for by placing a temperature recording device, preferably a receptacle T similar to C with a connecting tube U like E into the same chamber with the stress meter, but not connected up to receive any pressure from any source.

In actual operation it is apparent that this device when set up will record any movement of either or both faces, and any movement either away from or toward each other, which movement will be communicated to container C through base D, rod J, connecting block N and rod Q. If the surfaces A and B move toward each other the flexible container C is compressed forcing a portion of the contained liquid into tube E which movement is readily discerned at the calibrated transparent reading end thereof. In order to record movement of surfaces A and B or members similar in character away from each other, container C may be provided with a spring S under rod J within container C. An alternate method of accomplishing the same purpose would be by constructing the walls of container C in such a manner and of such material that if external pressure were removed the upper portion would expand in the direction of surface A thus increasing the volume of liquid in container C and reducing it in tube E which movement would likewise be discernible at the calibrated transparent reading end of said tube E.

We do not limit our invention to the specific arrangement, size, or shape of parts or structure herein described, but could make numerous modifications therefrom without departing from the spirit of our invention.

Having now described our invention, what we claim as new and desire to secure by Letters-Patent, is—

1. A stress measuring device comprising a base, a flexible liquid container on said base, a small tube entering and attached to said container, both said container and tube being provided with a liquid therein, a rod attached to said container, an upper rod, a block for connecting said rods, an adjusting nut for calibrating the device operating on the threaded end of upper rod and against upper portion of said connecting block, as and for the purpose described.

2. A stress measuring and testing device comprising a base member, a hollow flexible liquid-tight container, a small tube entering and attached to said container, with its free end calibrated and constructed of transparent material, both said container and tube being provided with a liquid therein, a spring means within and attached to the top and bottom of said container to expand the same if external pressure is removed, a rod attached to said container at one end and to a connecting block at the other end, said connecting block, another rod threaded to fit an adjusting nut, said adjusting threaded nut placed above said connecting nut, for calibrating and adjusting the device and operating against said connecting block and adapted to be screwed up or down on threaded portion of last mentioned rod, forming means for transmitting motion to said container, two angled side rods rigidly affixed into opposite sides of said connecting block at their upper ends, guide sleeves rigidly affixed to said base member into which the free ends of said side rods are respectively placed, a spring means within each guide sleeve supporting respective side rods, and a yoke rigidly affixed at ends to said side rods and serving as a guide and support for said lower rod which passes, snugly fitted, through said yoke, substantially as and for the purposes described.

In testimony whereof we affix our signatures.

WAYNE A. PERKINS.
WARREN W. GAYMAN.